United States Patent
Amesoeder et al.

(10) Patent No.: US 7,909,920 B2
(45) Date of Patent: Mar. 22, 2011

(54) DESICCANT BOX FOR DEHUMIDIFYING AIR

(75) Inventors: Dieter Amesoeder, Bietigheim-Bissingen (DE); Stephan Niemeyer, Steinheim (DE); Eugen Koch, Schoemberg (DE)

(73) Assignee: Mann + Hummel GmbH, Ludwigsburg (DE)

( * ) Notice: Subject to any disclaimer, the term of this patent is extended or adjusted under 35 U.S.C. 154(b) by 302 days.

(21) Appl. No.: 12/174,886

(22) Filed: Jul. 17, 2008

(65) Prior Publication Data

US 2009/0038327 A1    Feb. 12, 2009

(30) Foreign Application Priority Data

Jul. 20, 2007    (DE) .......................... 10 2007 034 435

(51) Int. Cl.
*B01D 45/08* (2006.01)
*B01D 53/26* (2006.01)

(52) U.S. Cl. ................. 96/131; 96/137; 96/139; 96/149; 96/152

(58) Field of Classification Search ................. 96/121, 96/131, 134, 137, 139, 147, 149, 152; 55/DIG. 17; 34/80

See application file for complete search history.

(56) References Cited

U.S. PATENT DOCUMENTS

| | | | | |
|---|---|---|---|---|
| 3,464,186 A | * | 9/1969 | Walker et al. | 96/115 |
| 4,581,047 A | * | 4/1986 | Larsson | 96/131 |
| 5,286,282 A | * | 2/1994 | Goodell et al. | 96/113 |
| 5,622,544 A | * | 4/1997 | Shamine et al. | 96/134 |
| 6,484,413 B1 | * | 11/2002 | Larsson | 34/80 |
| 6,723,154 B2 | * | 4/2004 | Olsson et al. | 95/118 |
| 6,951,581 B2 | * | 10/2005 | Fornof et al. | 95/122 |
| 2007/0144350 A1 | | 6/2007 | Paling | |

FOREIGN PATENT DOCUMENTS

| | | | |
|---|---|---|---|
| DE | 19627889 A1 | | 1/1998 |
| DE | 19627889 A1 | * | 1/1998 |
| DE | 19650186 A1 | | 6/1998 |
| DE | 19721230 A1 | | 11/1998 |
| DE | 10313575 | | 9/2004 |
| EP | 1529562 A | | 5/2005 |
| WO | WO2004/103509 A | | 12/2004 |
| WO | WO 2006/123138 A1 | * | 11/2006 |

* cited by examiner

*Primary Examiner* — Frank M Lawrence
(74) *Attorney, Agent, or Firm* — James Hasselbeck

(57) ABSTRACT

The invention concerns a desiccant box for dehumidifying air, with a cylindrical outer housing (10), a lid (11) that closes the outer housing, and an inner housing (12) to accommodate desiccant (13). The lid (11) features at least one inflow opening (14) and at least one outflow opening (15), the contour of the outer housing opposite the lid being curved. Moreover, another inner housing (17) is provided which is located in the area of the contour (16) and runs approximately along this contour, this inner housing being also filled with desiccant (18), and the two inner housings (12 and 17) being connected to each other.

11 Claims, 4 Drawing Sheets

DESICCANT BOX FOR DEHUMIDIFYING AIR

CROSS REFERENCE TO RELATED FOREIGN APPLICATIONS

This application claims priority benefit under 35 U.S.C. 119 to German Utility Patent Application number 10 2007 034 435.1, having a filing date of Jul. 20, 2007 at the German Patent Office.

TECHNICAL FIELD

The present invention relates to air drying devices and, more particularly, to a desiccant box for dehumidifying air.

BACKGROUND OF THE INVENTION

The present invention relates to a desiccant box for dehumidifying air. Germany patent DE 103 13 575 discloses a desiccant box having an inner housing that accommodates the desiccant and an outer housing with a cover lid. To fasten the inner housing and compress the desiccant, there is a compression spring between the inner and the outer housing. The compression spring ensures that the desiccant remains compact, even under extreme vibrations and shocks, and effectively prevents the individual particles or pearls of the desiccant from rubbing against each other, thus causing abrasion.

A disadvantage of the prior art is that it is not possible to completely fill the outer housing with desiccant. Usually, the inner housing is first filled with desiccant, closed, and then inserted into the outer housing. Since the filling must take place from the curved side, the desiccant can only be filled up to the outer edge of the inner housing.

U.S. Pat. No. 6,484,413 discloses an air dehumidifier having an inner housing which adjusts to the curved contour of the outer lid, but compression springs are provided on the opposite side to support an axially movable lid. A disadvantage of this known device is that a cavity that cannot be filled is created, which might provide a bypass path for the air that is to be dehumidified.

SUMMARY OF THE INVENTION

The present invention is intended to avoid the mentioned disadvantages and to provide a desiccant box for dehumidifying air that has an optimum filling level and enables process-reliable filling.

The main advantage of the invention is that there are two inner housings or two chambers in the desiccant box which optimally adjust to the outer contour of the overall system. Both inner housings/chambers are completely filled with desiccant and connected to each other during assembly. The two inner housings are arranged concentrically to each other and fill the cylindrical outer housing almost completely.

In one embodiment of the invention, at least one of the two inner housings shall be equipped with an air-permeable lid. That facilitates assembly, i.e. it prevents the granulated desiccant from flowing out of the housing when the two inner housings are put together.

In a further embodiment of the invention, both inner housings are equipped with air inlets/outlets. They are arranged such that the air to be dehumidified flows through the granules as evenly as possible. To facilitate assembly, both inner housings are equipped with snap-in connections at their coupling point; in particular, such a connection can be realized economically and easily, especially with plastic housings. Instead of snap-in connections, it is also possible to give one of the two parts a conical design in order to connect them. A compression spring acts centrally on both inner housings which form a structural unit, and its pressure is transmitted to the desiccant, so it is not shaken up, even when the device is used for a long time.

To avoid the ingress of dust or filth via the air that is to be dehumidified, a filter element in the form of a particle filter can be provided inside the outer housing.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
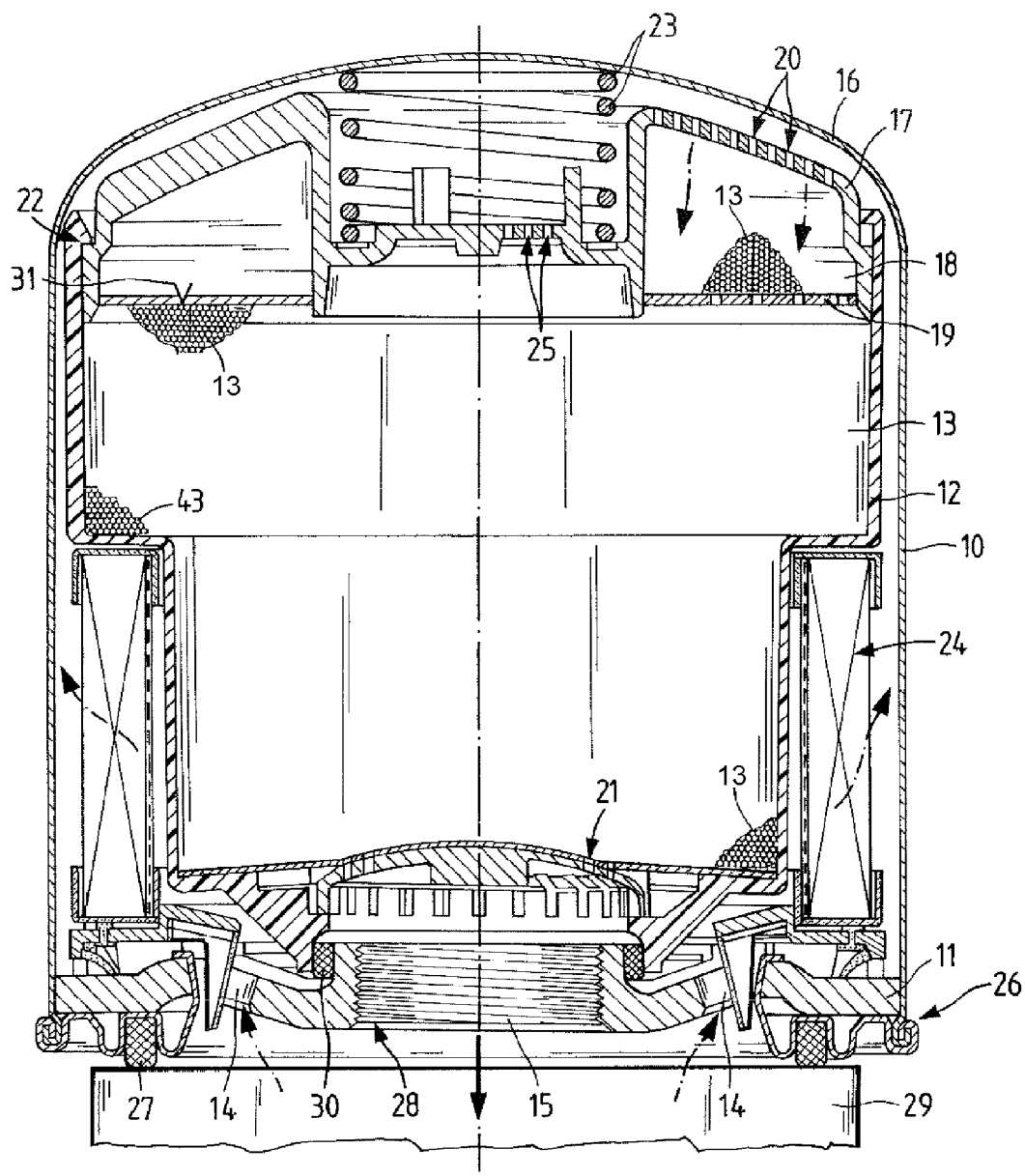
FIG. 1 is a sectional representation of a desiccant box, consistent with the present invention.

The discussion is now directed to FIGS. 1, 2, 3 and 4. The desiccant box according to FIG. 1 consists of an outer housing 10 that is closed by a lid 11. The lid 11 and the outer housing are connected by means of a flanged plate 26. The flanged plate 26 has a sealing element 27. The lid 11 features one or more inflow openings 14 and a thread 28 in the flange plate 26 surrounding an outflow opening 15. The thread 28 adapts the desiccant box to be connected by a hollow pipe segment to a carrier plate 29, which is illustrated only in outline.

Within the cylindrical outer housing 10, there is a cylindrical first inner housing 12 that abuts the lid 11 through an inserted seal 30. This inner housing 12 is filled with desiccant granules 13 up to the upper edge 31. Above the first inner housing 12, there is second inner housing 17 that is also filled with desiccant 18. This second inner housing 17 is closed by means of a lid 19.

Once the second inner housing 17 has been filled with desiccant 18, the lid 19 prevents the desiccant 18 from falling out during handling or when the second inner housing 17 is connected to the inner housing 12.

The second inner housing 17 has air inlets 20, and the inner housing 12 has air outlets 21. The air to be dehumidified flows through the lid 11 via the inflow openings 14, it then flows through a filter element 24 designed as an air-oil separator element, and it reaches the desiccant bed via the air inlets 20. The second inner housing 17 is in contact with a compression spring 23 that is supported by the contour 16 of the outer housing 10. The compression spring 23 functions to immobilize the desiccant, so the filling cannot loosen.

Inside the compression spring 23, at the support surface for the compression spring, there are also air inlets 25 which ensure that the air also flows through the desiccant in the center.

To facilitate assembly, the first inner housing 12 and the second inner housing 17 are equipped with snap-in connections 22 at their coupling point; in particular, such a connection can be realized economically and easily, especially with plastic housings. A compression spring 23 acts centrally on both inner housings 17,12 which form a structural unit, and its pressure is transmitted to the compression medium, for example desiccant 13,18. The snap-in connection 22 is operable to slidably connect the inner housings 12, 17 such that the desiccant can be compressed by the compression spring 23. Action of the compression spring 23 operates to maintain compression on the desiccant 13,18 with the effect that the desiccant 13,18 remains immobilized even when the device is used for a long time.

Figure 2:
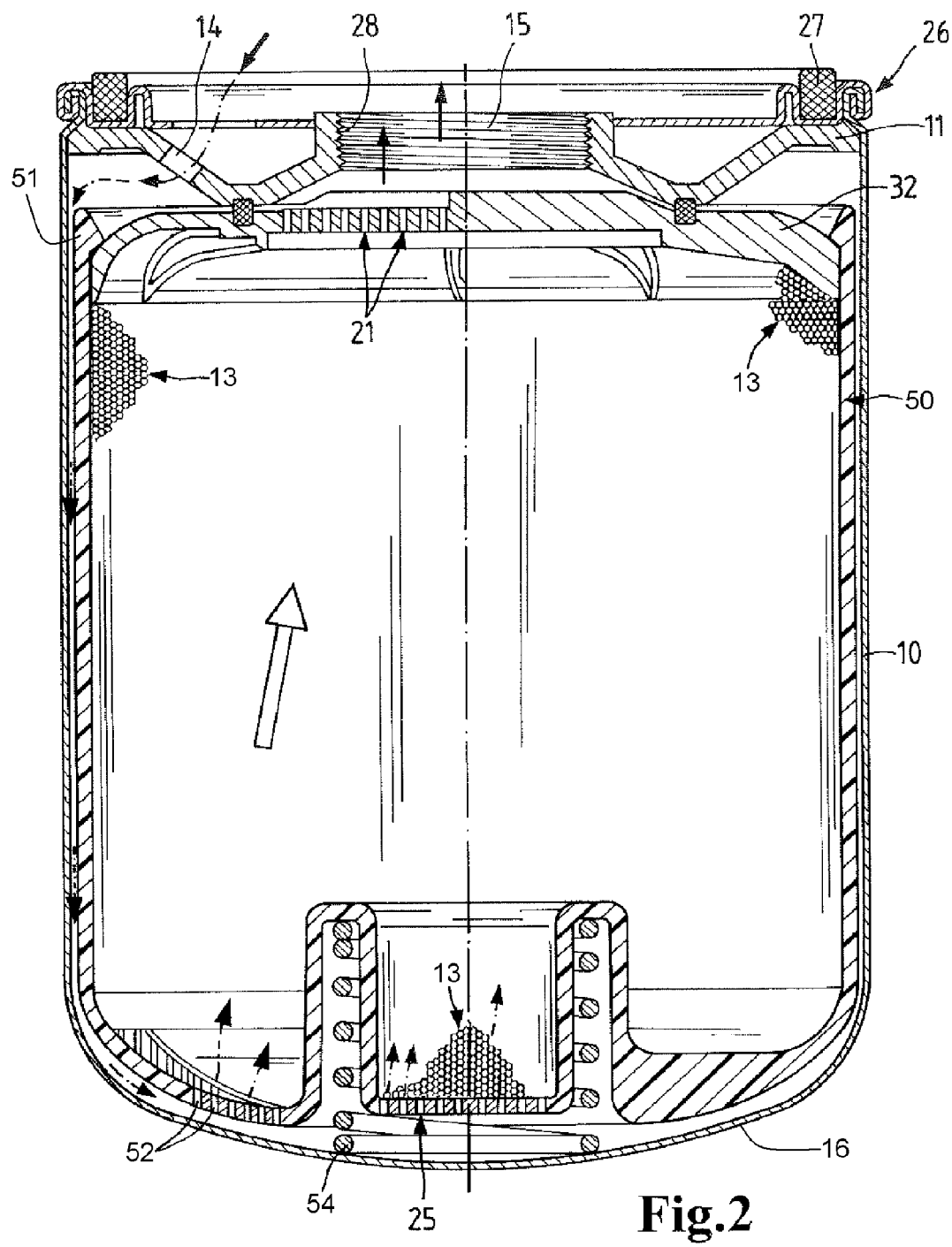
FIG. 2 is a sectional representation of one variant of a desiccant box, consistent with the present invention.

The variant of the present invention according to FIG. 2 shows a desiccant box with a reversed inner housing 50. In the reversed inner housing 50 of FIG. 2, the concentric snap-in connection 51 between the lid 32 and the inner housing 50 is positioned proximate to the outlet opening 15 side of the desiccant box. The concentrically designed snap-in connection 51 is operable to slidably connect the inner housing 50 and the lid 32 such that the desiccant 13 can be compressed by the compression spring 54. In all provided drawing Figures, identical components are shown with the same reference numbers. The contour of the lower part of this inner housing 50 is curved. At the lower part of the inner housing 50 a compression spring 54 is clamped between the inner housing 50 and the contour 16 of the outer housing 10. The inner housing 50 is closed with a lid 32. The lid 32 is sized and configured to snap into the inner housing 50, for example, and be supported by the lid 11 of the desiccant box. The inner housing 50 includes air inlets 52 in a portion of the inner housing 50 proximate to the contour 16 and air outlets 21 in a portion of the inner housing 50 proximate to the outflow opening 15.

Figure 3:
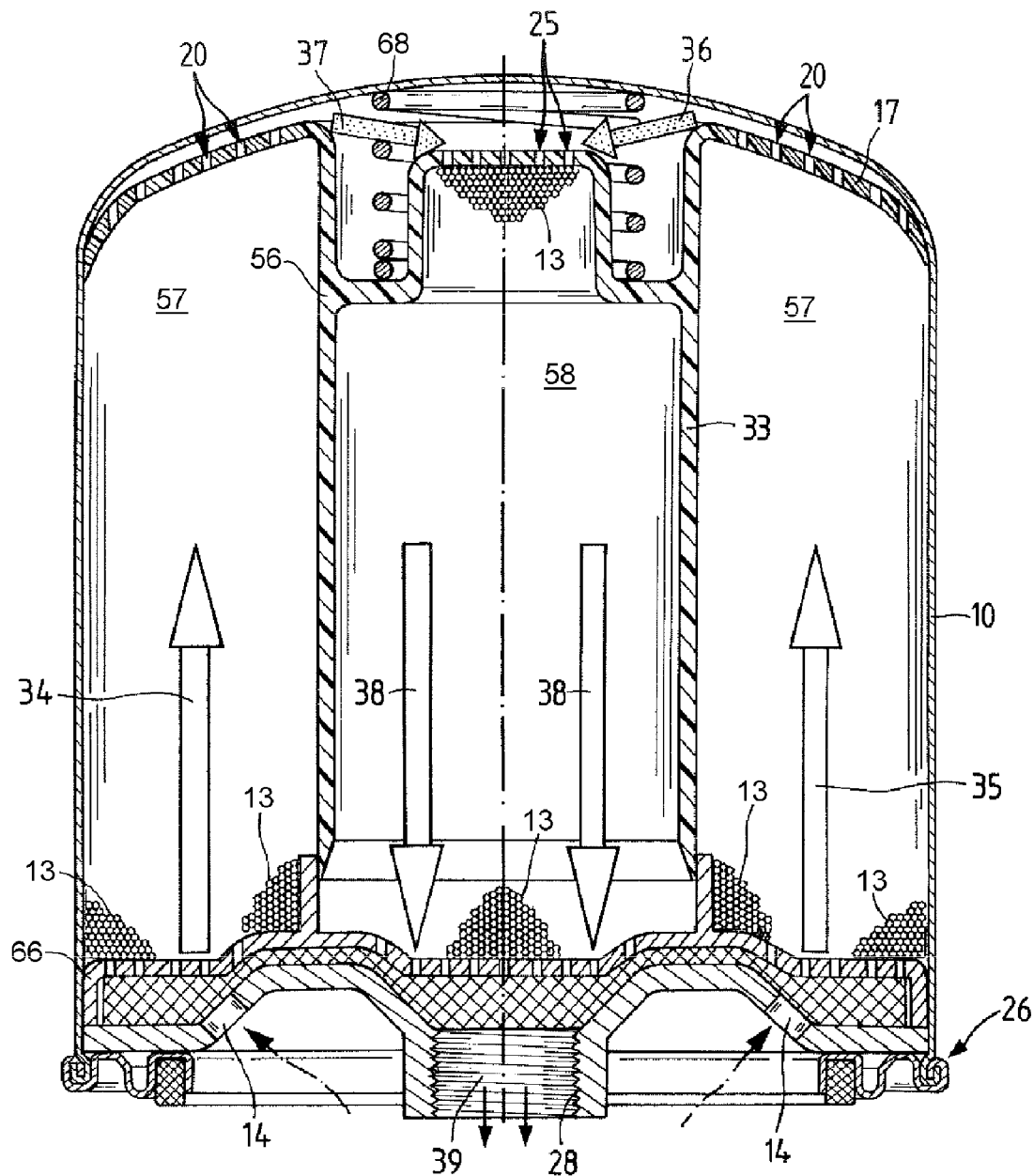
FIG. 3 is a sectional representation of another variant of a desiccant box, consistent with the present invention.

FIG. 3 shows another variant of the present invention that features an housing 56 that defines a first inner housing having a first chamber 58 and a second inner housing having a second chamber 57. The chambers 57, 58 are configured to receive desiccant 13 and are arranged concentrically to each other. The chambers 57, 58 are separated from each other by a cylindrical wall 33. Advantageously, the cylindrical wall 33 permits the air to be dehumidified to flow to through the desiccant 13 for a longer time due to the extend flow through path. The air flows into the outer chamber 57 as shown by arrow 34, 35, then through an area of the upper contour as shown by 36, 37. Air then flows into the inner chamber 58 as shown by arrows 36, 37, and leaves this inner chamber 58 as shown by arrow 38 in downward direction through the threaded outflow opening 39. A lid 66 is slidably connected to the outer housing 10 and the cylindrical wall 33, the slidable connection operable to permit the compression spring 68 to compress the desiccant in the chambers 57, 58.

Figure 4:
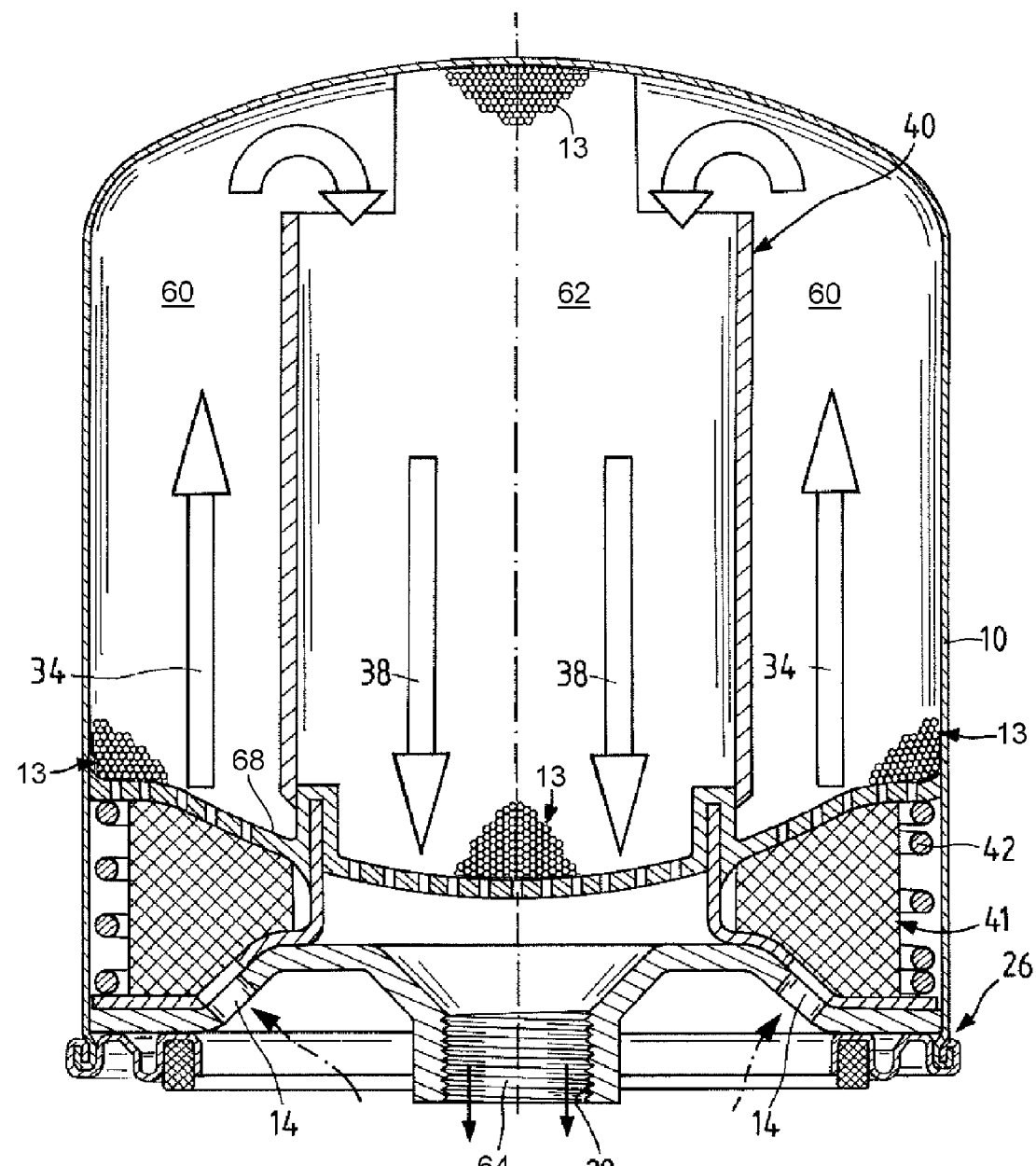
FIG. 4 is a sectional representation of another variant of a desiccant box, consistent with the present invention.

FIG. 4 shows another variant of the present invention that extends the through-flow time as well. For this purpose, a cylindrical wall 40 is provided in the desiccant 13, defining an inner chamber 62 and an outer chamber 60. The chamber 62 defines a first inner housing and chamber 60 defines a second inner housing. A lid 68 is slidably connected to the cylindrical wall 40 separating chambers 60,62, the slidable connection being operable to permit compression of the desiccant 13 by action of the compression spring 42. In a similar fashion to the discussion of FIG. 3, air flows through outer chamber 60 and inner chamber 62 and leaves the drying system (desiccant box) via the threaded outflow opening 64, dehumidified and purified.

The purification takes place by means of a fleece 41 (which serves to remove larger particulate contaminants) together with the compression action of the spring 42 that operates to maintain the desiccant bed 13 tightly packed providing a tortuous paths to air flow and advantageously increasing the efficiency of water removal from the filtered air stream.

While the best modes for carrying out the invention have been described in detail, those familiar with the art to which this invention relates will recognize various alternative designs and embodiments for practicing the invention within the scope of the appended claims.

The invention claimed is:

1. A desiccant box for dehumidifying air, comprising:
   a cylindrical outer housing having a curved contour in a portion of said housing;
   a lid having at least one inflow opening and at least one outflow opening, said lid closing said outer housing at a portion of said outer housing opposite said contour;
   a first inner housing defining a first chamber;
   a second inner housing positioned proximate to said contour and running approximately along said contour, said second inner housing defining a second chamber, said second inner housing being connected to said first inner housing; and
   desiccant at least partially filling said chambers of said first inner housing and said second inner housing,
   wherein said first inner housing and said second inner housing snap into each other by means of a concentrically designed snap-in connection.

2. The desiccant box according to claim 1, wherein said first inner housing and/or said second inner housing includes an air-permeable lid configured to retain said desiccant within said respective inner housing.

3. The desiccant box according to claim 1, wherein at least one of said inner housings includes air inlets positioned proximate to said contour.

4. The desiccant box according to claim 1, wherein said first inner housing includes air outlets positioned proximate to and in fluid communication with said outflow opening.

5. The desiccant box according to claim 2, wherein said first inner housing includes air outlets positioned proximate to and in fluid communication with said outflow opening.

6. The desiccant box according to claim 1, further comprising
   a compression spring to compress said desiccant, said compression spring being supported by said contour at one end and by one of said inner housings at an opposing end of said compression spring,
   wherein said snap-in connection slidably connects said inner housings such that said desiccant can be compressed by said compression spring.

7. The desiccant box according to claim 6, wherein
   said first inner housing and/or said second inner housing further includes an air-permeable lid configured to retain said desiccant within said respective inner housing;
   wherein at least one of said inner housings further includes air inlets positioned proximate to said contour; and
   wherein said first inner housing further includes air outlets positioned proximate to and in fluid communication with said outflow opening.

8. The desiccant box according to claim 7, further comprising
   a filter element positioned in inflowing air that is to be dehumidified.

9. A desiccant box for dehumidifying air, comprising:
   a cylindrical outer housing having a curved contour in a portion of said housing;
   a lid having at least one inflow opening and at least one outflow opening, said lid closing said outer housing at a portion of said outer housing opposite said contour;
   a first inner housing defining a first chamber;
   a second inner housing positioned proximate to said contour and running approximately along said contour, said second inner housing defining a second chamber, said second inner housing being connected to said first inner housing, wherein said chambers of said first inner housing and said second inner housing are at least partially filled with desiccant;

a compression spring to compress said desiccant, said compression spring being supported by said contour at one end and by one of said inner housings at an opposing end of said compression spring; and a filter element positioned in inflowing air that is to be dehumidified;

wherein at least one of said inner housings includes air inlets positioned proximate to said contour; and wherein said first inner housing includes air outlets positioned proximate to and in fluid communication with said outflow opening.

10. The desiccant box according to claim 9, further comprising a concentrically designed slidable connection operable to connect said first inner housing and said second inner housing.

11. The desiccant box according to claim 9, further comprising an air-permeable lid separating said first inner housing and said second inner housing, said air-permeable lid configured to retain said desiccant within said respective inner housing.

* * * * *